(12) United States Patent
Maiyur et al.

(10) Patent No.: US 12,146,301 B2
(45) Date of Patent: Nov. 19, 2024

(54) AUTOMATIC TORQUE CONTROL SYSTEM

(71) Applicant: Caterpillar Inc., Peoria, IL (US)

(72) Inventors: Sudarshan A. Maiyur, Cary, NC (US); Jeffrey M. Pillis, Apex, NC (US)

(73) Assignee: Caterpillar Inc., Peoria, IL (US)

( * ) Notice: Subject to any disclaimer, the term of this patent is extended or adjusted under 35 U.S.C. 154(b) by 528 days.

(21) Appl. No.: 17/244,003

(22) Filed: Apr. 29, 2021

(65) Prior Publication Data

US 2022/0349155 A1 Nov. 3, 2022

(51) Int. Cl.
*E02F 9/26* (2006.01)
*B60W 30/18* (2012.01)
*B60W 40/06* (2012.01)
*E02F 9/22* (2006.01)

(52) U.S. Cl.
CPC ....... *E02F 9/265* (2013.01); *B60W 30/18172* (2013.01); *B60W 40/06* (2013.01); *E02F 9/2253* (2013.01); *B60W 2300/17* (2013.01); *B60W 2520/26* (2013.01); *B60W 2720/30* (2013.01)

(58) Field of Classification Search
CPC ....... E02F 9/265; E02F 9/2253; E02F 9/2079; E02F 9/262; B60W 30/18172; B60W 40/06; B60W 2300/17; B60W 2520/26; B60W 2720/30; B60W 2300/125; B60W 2510/1085; B60W 40/068; B60W 2520/10; B60W 2530/10; B60W 2540/215; B60W 2552/05; B60W 2552/40; B60W 30/188; B60W 40/13; B60K 28/08; B60K 28/16
See application file for complete search history.

(56) References Cited

U.S. PATENT DOCUMENTS

| | | | |
|---|---|---|---|
| 7,853,384 | B2 | 12/2010 | Johnson et al. |
| 8,649,945 | B2 | 2/2014 | Shirao |
| 9,464,410 | B2 | 10/2016 | Johnson et al. |
| 9,555,706 | B1 | 1/2017 | Mitchell et al. |
| 10,544,565 | B2 | 1/2020 | Berry |
| 2017/0073933 | A1 | 3/2017 | Tanaka |
| 2018/0073933 | A1* | 3/2018 | Keskin ............. G06F 1/206 |
| 2019/0360169 | A1 | 11/2019 | Tinker |
| 2020/0255018 | A1* | 8/2020 | Goli ............. B60W 30/18009 |

FOREIGN PATENT DOCUMENTS

| | | |
|---|---|---|
| EP | 2131072 A1 | 12/2009 |
| EP | 2667059 A1 | 11/2013 |

OTHER PUBLICATIONS

Written Opinion and International Search Report for Int'l. Patent Appln. No. PCT/US2022/021489, mailed Jul. 20, 2022 (13 pgs).

* cited by examiner

*Primary Examiner* — Jaime Figueroa
*Assistant Examiner* — Sihar A Karwan

(57) ABSTRACT

An automatic torque control system and methods for automatically controlling a torque of a vehicle are disclosed. The method includes detecting when the vehicle engages a load. The method further includes automatically decreasing the torque when the vehicle engages the load and prior to one or more wheels of the vehicle slipping.

20 Claims, 4 Drawing Sheets

AUTOMATIC TORQUE CONTROL SYSTEM

TECHNICAL FIELD

The present disclosure relates generally to transmission systems for vehicles, and more particularly, to an automatic torque control system.

BACKGROUND

Vehicles, such as wheel loaders, dozers, and other heavy equipment, are used to perform many tasks. To perform these tasks, the vehicles require an engine that provides torque through a transmission system to one or more transport mechanisms, such as wheels. Generally, it is desirable to provide a maximum torque to the wheels for various operations of the vehicle, such as accelerating, traveling at high speeds on grade, reversing, or other general maneuvering. In some instances, this maximum torque may cause the wheels to slip and may lead to increased wear on the wheels. For example, when the vehicle engages a load, such as a pile of material (e.g., dirt, gravel, etc.), the wheels may slip if the torque is too high for the amount of traction provided between the wheels and the ground surface. This increased wear may lead to tire failure and the tire may need replacement before a full life. Wheel slippage may also cause the slipping wheel to dig into the ground surface, which may lead to time and fuel inefficiencies to complete a task. An inexperienced operator may not know how to manage the controls, pedals, etc. to prevent the wheels from slipping. Some traction control systems may enable an operator to manually adjust the torque to various settings based on the type of ground surface. However, such systems may provide for static settings and inexperienced operators may still not know how to manage the various settings or when to engage a specific setting to prevent slippage. Further, current traction control systems may reduce the torque in response to one or more wheels slipping. However, such systems are reactionary and may be inadequate for preventing the wheels from slipping.

U.S. Pat. No. 9,464,410 to Johnson et al., issued on Oct. 11, 2016 ("the '410 patent"), describes a torque adjustment controller that responds to detected wheel slippage. The controller of Johnson can vary a motor control signal (e.g., the motor shaft speed), in response to detected wheel slippage. The controller can also decrease a reference torque level or various torque thresholds in response to wheel slippage in order to compensate for detected wheel slippage. However, the controller of Johnson is reactionary and may only reduce torque in response to a wheel actually slipping. Thus, Johnson may not adequately prevent or reduce wheel slippage.

The automatic torque control system of the present disclosure may solve one or more of the problems set forth above and/or other problems in the art. The scope of the current invention, however, is defined only by the attached claims, and not by the ability to solve any specific problem.

SUMMARY

In one aspect, a method for automatically controlling a torque of a vehicle is disclosed. The method includes: detecting when the vehicle engages a load; and automatically decreasing the torque when the vehicle engages the load and prior to one or more wheels of the vehicle slipping.

In another aspect, an automatic torque control system is disclosed. The system includes: a vehicle having one or more wheels; a transmission system for providing a torque to the one or more wheels; and a controller configured to: detect when the vehicle engages a load; and automatically decrease the torque when the vehicle engages the load and prior to the one or more wheels slipping.

In yet another aspect, a method for automatically controlling a torque of a vehicle is disclosed. The method includes: detecting an auto torque command is engaged; setting the torque to a maximum torque setting; detecting when the vehicle engages a load; automatically decreasing the torque to a base torque setting when the vehicle engages the load and prior to one or more wheels of the vehicle slipping, wherein the base torque setting is based on a type of ground surface; and automatically increasing the torque to the maximum torque setting when the vehicle disengages from the load.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1:
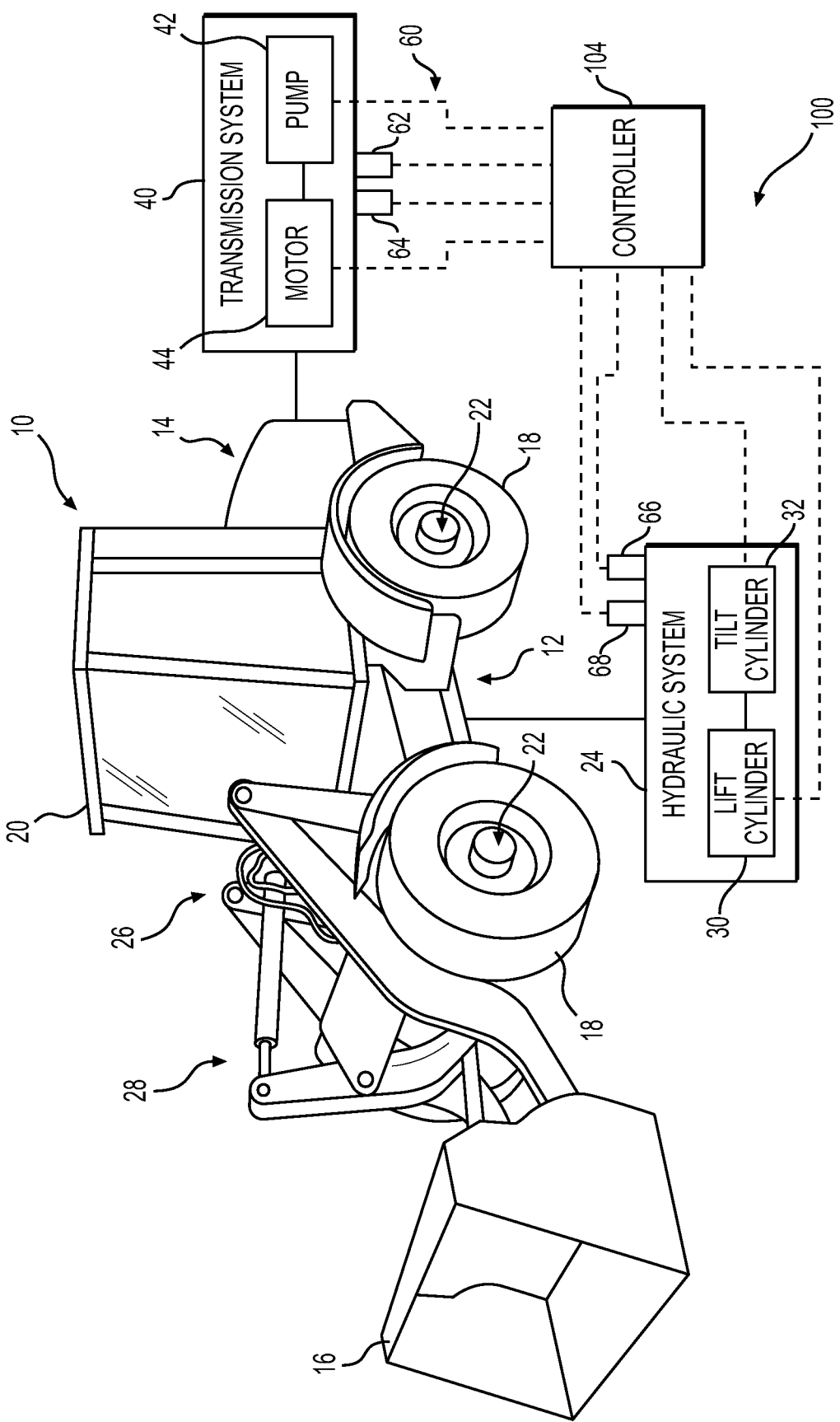
FIG. 1 is a schematic perspective view of a vehicle having an automatic torque control system, according to aspects of the disclosure.

FIG. 1 illustrates a schematic perspective view of a vehicle 10 having an automatic torque control system 100. The disclosure herein may be applicable to any type of vehicle, however, reference will be made below particularly to a wheel loader. For example, vehicle 10 may include an off-highway truck, a bulldozer, or similar ground engaging machines, such as those used for construction, mining, quarrying, or the like. As shown in FIG. 1, vehicle 10 may include a frame 12, machinery 14, and an implement 16. Frame 12 generally supports the various assemblies and mechanical systems of the vehicle 10 and may be supported on a ground surface by transport mechanisms, such as wheels 18. As used herein, "wheels" and "transport mechanisms" may be used interchangeably. Wheels 18 may allow vehicle 10 to maneuver about the ground surface to a desired location for performing a task, such as loading materials in implement 16. Frame 12 may support the machinery 14, which may include engines, motors, batteries, pumps, air compressors, hydraulic fluid storage tanks, and/or any other equipment necessary to power and operate vehicle 10. Frame 12 may further support an operator cab 20, from which a user, or operator, may maneuver and control vehicle 10 via user interfaces, controls, and/or displays (not shown). The implement 16 illustrated in the aspect of FIG. 1 is a bucket for use in picking up and transporting material. It is understood that implement 16 may include any type of work implement, such as a digging tool, a fork lift, a blade, or the like.

As further shown in FIG. 1, vehicle 10 also includes axle assemblies 22, a hydraulic system 24, and a transmission system 40. The axle assemblies 22 are in operable communication with the engine. Rotation of the axle assemblies 22 and the wheels 18 is generally powered by the engine through engagement with a powertrain (not shown). The axle assemblies 22 may include a locking mechanism (not shown), known as a locking differential, to lock the wheels 18 on the respective axle assembly 22 together. The locking mechanism may include any type of locking differential mechanism, such as compressed air, mechanical, electronic, automatic, or the like. When the locking mechanism is unlocked (e.g., in an open position), each wheel 18 on a respective axle assembly 22 may rotate at different speeds. For example, one wheel 18 may rotate while the other wheel remains stationary due to differences between traction of the respective wheels 18. When the locking mechanism is locked, both wheels 18 on the axle assembly 22 will rotate at the same speed regardless of the traction conditions of the respective wheels 18. For example, if one wheel 18 is unable to rotate, the other wheel 18 will be prevented from spinning. The locking mechanism may be controlled by user input via a differential locking switch (not shown) and/or may be controlled automatically by controller 104, as detailed further below.

The hydraulic system 24 (shown schematically in FIG. 1) may include a lift assembly 26 and a tilt assembly 28. The lift assembly 26 and tilt assembly 28 are pivotally mounted on vehicle 10 and in operable communication with the implement 16. Movement of the lift assembly 26 and tilt assembly 28 is translated to the implement 16 to control a height and/or an angular tilt of the implement 16. The lift assembly 26 includes one or more lift cylinders 30 that are adapted to actuate the lift assembly 26 to change a height of the implement 16. The lift cylinders 30 may include a rod and cylinder assembly and may receive a pressurized fluid from hydraulic system 24 (e.g., from a hydraulic pump and fluid storage tank) to actuate the lift assembly 26. The tilt assembly 28 similarly includes one or more tilt cylinders 32 that are adapted to actuate the tilt assembly 28 to change a tilt, or pivotal position, of the implement 16. The tilt cylinders 32 may include a rod and cylinder assembly and may receive a pressurized fluid from the hydraulic system 24 to actuate the tilt assembly 28.

Transmission system 40 (shown schematically in FIG. 1) may include, for example, a continuously variable transmission (CVT), a hybrid transmission, or the like. For example, transmission system 40 may include a hydraulic CVT, a hydro-mechanical CVT, an electric CVT, or the like. Transmission system 40 may include a driving element, such as a pump 42, and a driven element, such as a motor 44, that is driven by the driving element. Pump 42 may include a variable displacement hydraulic pump and motor 44 may include a variable displacement hydraulic motor configured to receive pressurized fluid from pump 42. Pump 42 may be connected to drive motor 44 with pressurized fluid via one or more conduits based on a torque, or pump, command, as detailed further below. Thus, transmission system 40 may receive a power output from the engine (e.g., at pump 42) and transmit the power output (e.g., via motor 44) to the wheels 18 through axle assemblies 22. For example, transmission system 40 may provide a torque to the wheels 18 through axle assemblies 22.

Automatic torque control system 100 includes a controller 104, such as an engine control module (ECM), and a sensor system 60 connected to controller 104. Sensor system 60 may include one or more sensors for measuring operating conditions, such as pressure sensors, position sensors, temperature sensors, flow sensors, speed sensors, or the like. For example, sensor system 60 may include a transmission system pressure sensor 62, a vehicle speed sensor 64, an implement position sensor 66, and implement pressure sensors 68 (only one of which is depicted). Transmission system pressure sensor 62 may be located in transmission system 40 downstream of pump 42 and may sense values indicative of a pressure of hydraulic fluid in transmission system 40. Vehicle speed sensor 64 may be located in transmission system 40 and may sense values indicative of speed of vehicle 10. For example, vehicle speed sensor 64 may sense a transmission output speed of transmission system 40 (e.g., a rotational speed of a drive shaft or input shaft of transmission system 40), a rotational speed of motor 44, a rotational speed of an axle of the axle assemblies 22, or the like. Vehicle speed sensor 64 may include any type of speed sensor, such as a toothed disk and magnetic coil sensor, or the like, and may be located anywhere on vehicle 10 (e.g., at a transport mechanism, on an axle, or the like) to sense a ground speed of vehicle 10. Implement position sensor 66 may include one or more sensors (e.g., rotary position sensors or linear position sensors) for measuring a lift position and/or a tilt position of implement 16. For example, implement position sensor 66 may include a lift position sensor to detect a position of the lift assembly 26 and/or a tilt position sensor to detect a position of the tilt assembly 28. Implement position sensor 66 may also include a sensor (e.g., IMU), located on implement 16 directly for detecting a position of implement 16. Implement pressure sensors 68 may be located in hydraulic system 24 at lift cylinder 30 and/or at tilt cylinder 32 and may sense values indicative of a pressure of hydraulic fluid in lift cylinder 30 and/or tilt cylinder 32, respectively. It is understood that sensors 62, 64, 66, 68 may include any type of sensor such as resistive sensors, inductive sensors, capacitive sensors, piezoelectric sensors, optical sensors, micro electro-mechanical system sensors, or the like. Further, sensor system 60 may include physical sensors and/or virtual sensors (e.g., sensors that determine a value indirectly by controller 104 based on other sensed values) and may include any number and/or combination of sensors as necessary for sensing or measuring operating conditions.

Figure 2:
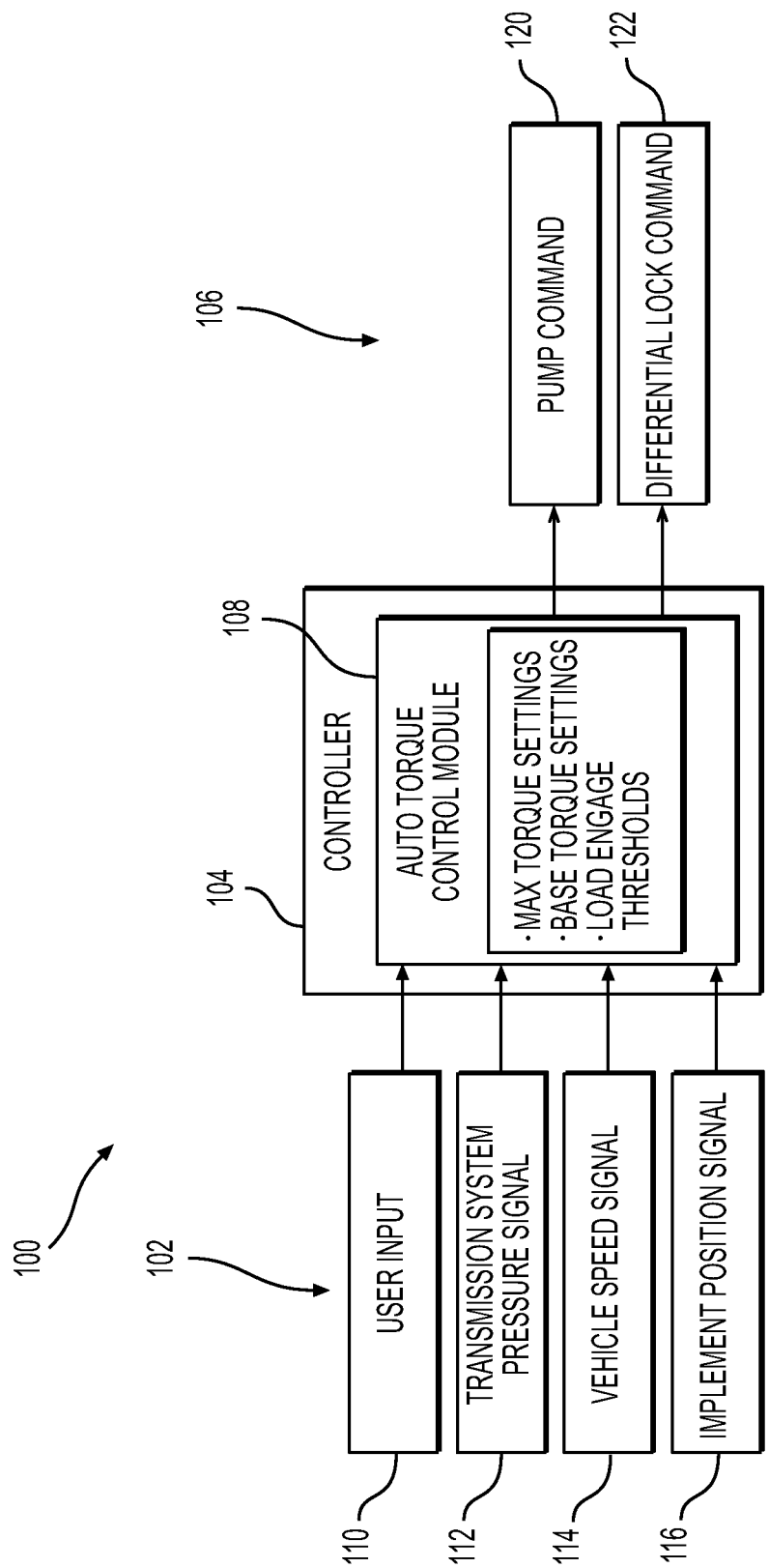
FIG. 2 is a schematic view of the exemplary automatic torque control system for the engine system of FIG. 1.

FIG. 2 illustrates a schematic view of the exemplary automatic torque control system 100 for operation and/or control of at least portions of vehicle 10. System 100 may include inputs 102, controller 104, and outputs 106. Inputs 102 may include, for example, user input 110, transmission system pressure signal 112 from pressure sensor 62, vehicle speed signal 114 from speed sensor 64, and/or implement position signal 116 from position sensor 66. User input 110 may include input of an automatic torque control command and input of a type of ground surface. The user input 110 may also include input of an override command for ending the automatic torque control command. The type of ground surface may indicate a predetermined coefficient of friction and/or a predetermined coefficient of traction, as detailed further below, for the ground surface on which the vehicle 10 is operating. The user input may be received from one or more input devices (not shown), such as a buttons, switches, knobs, computing devices, number pads, or the like. Further, it is understood that the input of the type of ground surface may be generated automatically (e.g., without user input) by controller 104. For example, controller 104 may detect the type of ground surface via one or more sensors and automatically input the type of ground surface for deriving the coefficient of friction and/or the coefficient of traction for the respective ground surface. It is understood that inputs 102 may include any type of input, as necessary, for performing method 300, described below. For example, inputs 102 may include other signals from transmission system 40 and/or other signals from hydraulic system 24 (e.g., pressure signals).

Outputs 106 may include, for example, a pump and/or motor command 120 and/or a differential lock command 122. Controller 104 also includes an auto wheel torque control module 108. Auto torque control module 108 may receive inputs 102, implement a method 300 for automatically controlling torque of vehicle 10 and control outputs 106, as described with reference to FIG. 3 below.

Controller 104 may embody a single microprocessor or multiple microprocessors that may include means for automatically controlling torque of vehicle 10. For example, controller 104 may include a memory, a secondary storage device, and a processor, such as a central processing unit or any other means for accomplishing a task consistent with the present disclosure. The memory or secondary storage device associated with controller 104 may store data and/or software routines that may assist controller 104 in performing its functions, such as the functions of method 300 of FIG. 3. Further, the memory or secondary storage device associated with controller 104 may also store data received from the various inputs 102 associated with automatic wheel torque control system 100. Numerous commercially available microprocessors can be configured to perform the functions of controller 104. It should be appreciated that controller 104 could readily embody a general machine controller capable of controlling numerous other machine functions. Alternatively, a special-purpose machine controller could be provided. Further, controller 104, or portions thereof, may be located remote from vehicle 10. Various other known circuits may be associated with controller 104, including signal-conditioning circuitry, communication circuitry, hydraulic or other actuation circuitry, and other appropriate circuitry.

Controller 104 may also include stored values for use by module 108. For example, the stored values may include maximum torque settings, base torque settings, and/or load engage thresholds or indicator values. The maximum and base torque settings correspond to a rimpull of vehicle 10. As used herein, "rimpull" is an amount of force exerted at the transport mechanisms (e.g., wheels 18) to move vehicle 10. The torque output from transmission system 40 may be controlled by a rimpull limit setting. For example, the rimpull limit may include a maximum allowable force at the interface between the transport mechanisms and the ground surface. Controller 104 may then control pump 42, as detailed below, to control the torque to the wheels 18 so that the rimpull is substantially equal to the rimpull limit. Thus, the rimpull may correspond to, and be controllable by, the torque provided by transmission system 40. Further, the maximum and base torque settings may correspond to maximum and base rimpull settings. For example, the maximum torque settings may define a maximum allowable torque at various speeds of vehicle 10. Likewise, the base torque settings may define a base torque at various speeds of vehicle 10. The base torque may include values of torque that are less than the corresponding maximum torque for the various speeds of vehicle 10. The lower "base" torque is a torque value that is tailored to help avoid slippage. For example, the base torque may be experimentally determined based on machine aspects, as detailed below. The base torque settings may include various settings for torque based on a type of ground surface. For example, the base torque settings may include different settings for the torque based on a coefficient of friction and/or coefficient of traction between the wheels 18 and the ground surface. Different types of ground surfaces (e.g., gravel, asphalt, concrete, earth, snow, wet, dry, etc.) may include different coefficients of friction and/or traction. The coefficients of friction and/or traction may be stored by controller 104. Further, the base torque settings may include a pre-slip setting. The pre-slip torque setting may provide torque values for a point right before the wheels 18 begin to slip at various speeds of vehicle 10.

Figure 4:
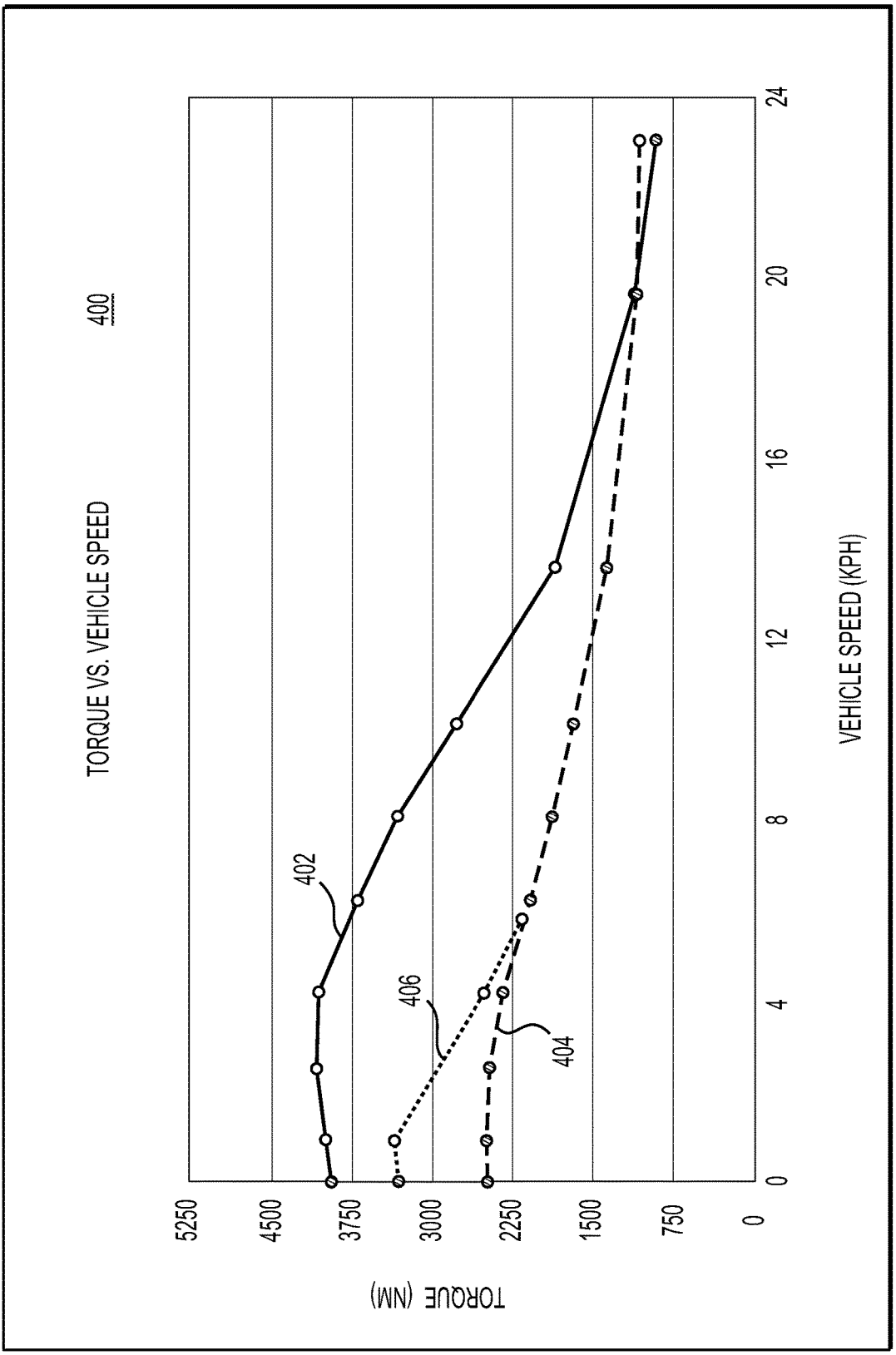
FIG. 4 is a plot of torque versus vehicle speed, according to aspects of the disclosure.

With reference to FIG. 4, the maximum and base torque settings may include different torque values for different values of values indicative of speed of vehicle 10 provided in a map or lookup table (e.g., plot 400 of torque (Nm) versus vehicle speed (KPH). For example, map or plot 400 illustrates that the maximum torque setting 402 may include a first set of torque values for various values of vehicle speed and the base torque setting 404 may include a second set of torque values for various values of motor speed. It is understood that the values of torque and vehicle speed in plot 400 are exemplary only, and plot 400 may include any scale and/or values, as necessary, for a particular application (e.g., a particular vehicle) of the system 100. The information used to derive the values of the map or lookup table may be determined by empirical analysis. Such empirical data may be obtained, for example, by operating a test vehicle 10 under predetermined conditions (e.g., under particular operating conditions) during, for example, bench testing. For example, the torque values for the maximum and base torque settings may be correlated to the values indicative of the speed of vehicle 10 (e.g., motor speed). Thus, the maximum and base torque settings are determined based on a map representative of empirical data of maximum and base torque values with respect to values indicative of speed of vehicle 10. While the exemplary embodiment details the maximum and base torque values as a function of values indicative of speed of vehicle 10, it is understood that the map or lookup table may provide maximum and base settings that correspond to other values indicative of rimpull, such as transmission system pressure, or the like, as a function of values indicative of speed of vehicle 10. Also, rather than create and store a map or plot 400 using discrete measured values, a suitable approximating mathematical equation could be employed instead. Further, in some embodiments, the base torque settings may include constant values such that the base torque settings are not a function of values indicative of vehicle speed. The base torque settings may include constant values less than the maximum torque settings. For example, the base torque settings may include values of torque that are 10%, 20%, 30%, 40%, 50%, 60%, 70%, 80%, or 90% of the maximum torque settings for all values indicative of vehicle speed. It is understood that the base torque settings may include any other constant torque values less than the maximum torque setting and/or may include any other torque values less than the maximum torque setting as a function of values indicative of vehicle speed (e.g., motor speed) or as a function of other operating values of vehicle 10.

Load engage thresholds and values may include one or more thresholds or indicator values for various operating conditions for indicating that vehicle 10 has engaged a load, such as a pile of material. For example, the load engage thresholds may include a transmission system pressure threshold, vehicle speed indicator values, and/or an implement position indicator value. The vehicle speed indicator values may include values of vehicle speed that indicate vehicle 10 is decelerating (e.g., vehicle speed is decreasing). The implement position indicator value may include one or more values of the implement position (e.g., lift position and/or tilt position) that indicate the implement is in a loading position, a digging position, and/or any other position for engaging with a load. Thus, controller 104 may determine that vehicle 10 is engaged with a load (e.g., implement 16 is getting loaded with material) when the transmission system pressure increases above the transmission system pressure threshold, the vehicle 10 is decelerating (e.g., vehicle speed is decreasing), and/or the implement 16 is in a load engaging position. It is understood that the stored values may include any other stored and/or derived values for performing method 300.

Pump and/or motor command 120 and differential lock command 122 outputs may include control of aspects of vehicle 10. Controller 104 may derive pump and/or motor command 120 based on the maximum and base torque settings, as detailed below. Pump and/or motor command 120 may be sent to pump 42 to control an output of hydraulic fluid from pump 42 and/or may be sent to motor 44 to control an output of motor 44 in order to control the torque output of transmission system 40. Differential lock command 122 may be sent to transmission system 40 to control the locking mechanism to automatically lock or unlock the locking mechanism, as detailed above.

INDUSTRIAL APPLICABILITY

The disclosed aspects of the automatic torque control system 100 of the present disclosure may be used in any vehicle 10 having a transmission system 40.

Referring to FIG. 1, during the operation of vehicle 10, an operator may control vehicle 10 to maneuver about the ground surface. For example, the operator may control vehicle 10 to accelerate, maneuver on-grade, maneuver up or down an incline, reverse, handle material (e.g., load implement 16), or the like. While maneuvering, transmission system 40 may control the torque to a default torque setting (e.g., maximum torque setting). The maximum torque setting may be desired for instances of maneuvering the vehicle 10 when the implement 16 is not being loaded. However, when the implement 16 is being loaded (e.g., when there is a force in the opposite direction of the rimpull, such as when the vehicle 10 is entering a pile of material, digging the ground, etc.), one or more wheels 18 may slip due to a lack of traction between the respective wheel 18 and the ground surface for the amount of torque being applied on the wheels 18. For example, the coefficient of friction and/or traction of the ground surface may be inadequate to provide traction to the wheels 18 for the amount of torque output from transmission system 40. Thus, one or more wheels 18 may begin to slip (e.g., rotate without moving vehicle 10 by a corresponding amount) and may cause undesirable wear of the respective wheels 18 and/or may cause the wheels 18 to dig into the ground surface. An inexperienced operator may not know how to control the vehicle 10 (e.g., the controls, pedals, etc.) to prevent the wheels 18 from slipping. Further, as detailed above, current traction control systems may be reactionary and may only adjust the torque in response to detecting when a wheel 18 actually slips. Thus, as detailed below with reference to FIG. 3, automatic torque control system 100 may automatically control the torque to prevent the wheels 18 from slipping when vehicle 10 engages a load and prior to the wheels 18 slipping.

Figure 3:
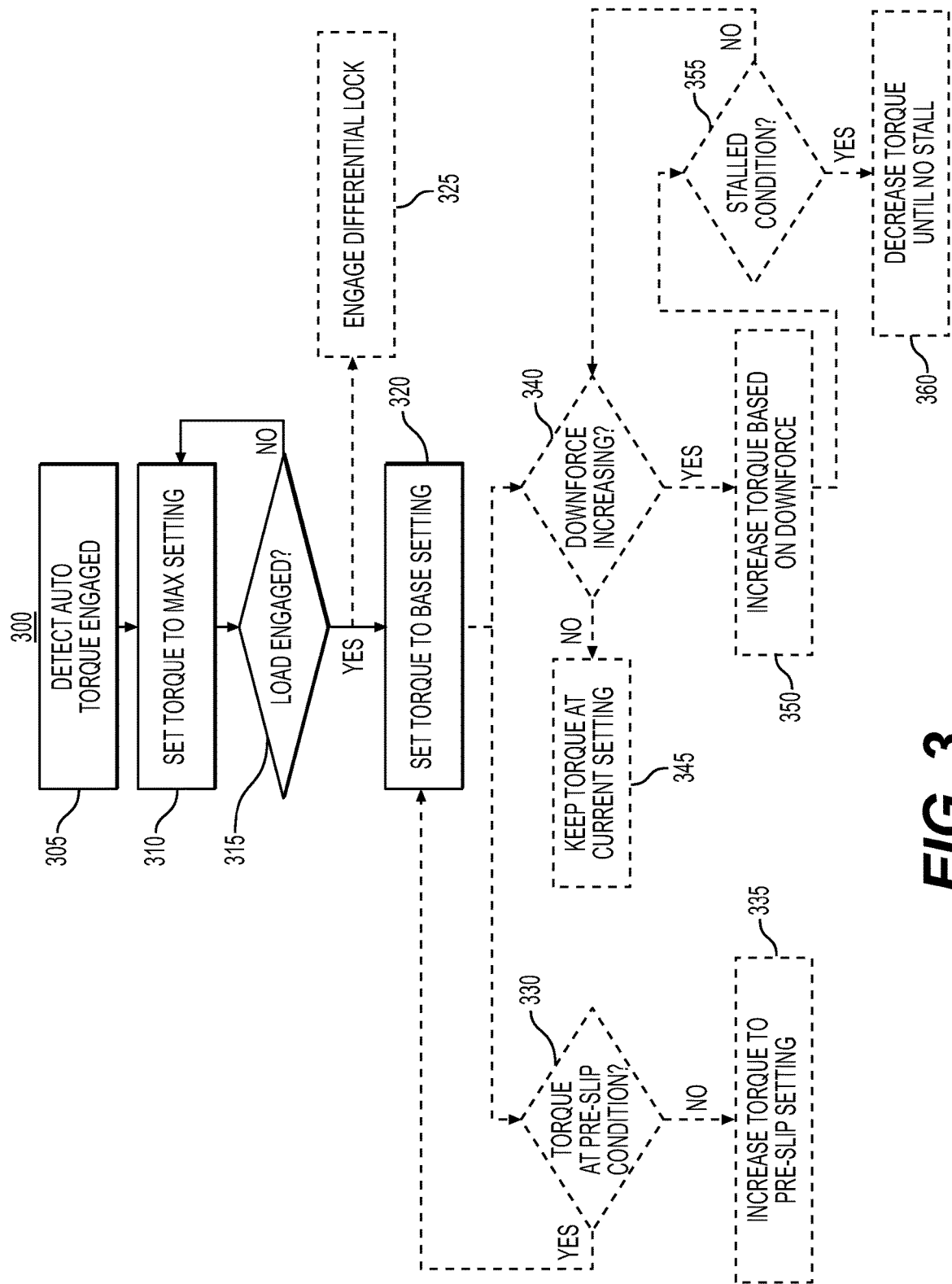
FIG. 3 provides a flowchart depicting an exemplary method for automatically controlling torque for the vehicle of FIG. 1.

FIG. 3 illustrates a flowchart depicting an exemplary method 300 for automatic controlling torque of vehicle 10. In step 305, module 108 may detect an automatic (auto) torque command is engaged. For example, module 108 receive user input 110 of the automatic torque command via a switch, a button, a knob, a computer input, or the like. In some embodiments, the automatic torque may be engaged by default (e.g., when vehicle 10 is powered on).

In step 310, when module 108 has detected auto torque is engaged, module 108 may set the torque to the maximum torque setting. Module 108 may control the torque to the maximum torque setting for the various speeds of vehicle 10. For example, module 108 may output a pump and/or motor command 120 and send the pump and/or motor command 120 to pump 42 for controlling the output of pump 42, and thus controlling the torque to the maximum torque setting.

In step 315, module 108 may determine whether vehicle 10 has engaged a load (e.g., a pile of material), prior to one or more wheels 18 slipping. For example, module 108 may determine that vehicle 10 is engaged with a load (e.g., implement 16 is being loaded with material, implement 16 is pushing material, etc.) when the transmission system pressure increases above the transmission system pressure threshold, the vehicle 10 is decelerating (e.g., vehicle speed is decreasing), and/or the implement 16 is in a predetermined, load engaging position (e.g., the implement 16 is lowered and in a filling position). If a load is not engaged (Step 315: NO), module 108 may continue to keep or operate the torque setting at the maximum torque setting. It is understood that module 108 may determine if vehicle 10 is engaged with a load by any means.

In step 320, when a load is engaged (Step 315: YES) and prior to one or more wheels 18 slipping, module 108 may set (e.g., reduce) the torque to the base torque setting. As detailed above, the base torque setting may include torque values for preventing wheel slippage. Module 108 may reduce or decrease the torque to the base torque setting (e.g., from the maximum torque setting) based on the type of ground surface (e.g., coefficient of friction and/or traction), as detailed above. For example, module 108 may output a pump and/or motor command 120 and send the pump and/or motor command 120 to pump 42 for controlling the output of pump 42 and/or to motor 44 for controlling output of motor 44, and thus controlling the torque to the base torque setting. Thus, module 108 may automatically decrease the torque when vehicle 10 engages a load. Module 108 may keep the torque at the base torque setting while the load is engaged. When vehicle 10 disengages the load (e.g., lifts the implement 16 after being filled with material) and/or reverses, module 108 may automatically set the torque at the maximum torque setting again (e.g., increase the torque from the base torque setting to the maximum torque setting). Module 108 may also set the torque to the maximum torque setting in response to user input 110 (e.g., when operator activates a switch or the like). Thus, module 108 may automatically set the torque to the maximum torque setting when vehicle 10 is not engaged with a load.

Further, method 300 may include optional and/or additional steps (shown with dashed lines in FIG. 3). For example, in step 325, when a load is engaged (Step 315: YES), module 108 may also automatically engage the differential lock. For example, module 108 may send the differential lock command 122 to transmission system 40 to engage the locking mechanism. Thus, the wheels 18 may be locked together on the axle assemblies 22 to further prevent one or more wheels 18 from slipping.

Further, it may be desirable to operate transmission system 40 at a torque setting right before wheels 18 begin to slip (e.g., a pre-slip condition) to ensure the vehicle 10 is pushing as hard as possible. Operating transmission system 40 at such a condition may ensure that the vehicle 10 is pushing as hard as possible (e.g., right before the wheels slip). However, in some instances, the base torque setting may not provide a torque for this pre-slip condition. For example, if the ground surface is hard (e.g., dry), additional torque greater than the base torque setting may be required to reach the pre-slip condition. Thus, in step 330, module 108 may determine whether the torque at the base torque setting is at the pre-slip condition. Module 108 may determine the wheels 18 are at a point right before slipping based on any means known in the art. If the torque is at the pre-slip condition (Step 330: YES), module 108 may continue to operate the torque at the base torque setting. If the torque is not at the pre-slip condition (Step 330: NO), in step 335, module 108 may automatically increase the torque from the base torque setting to a pre-slip torque setting 406 (as shown in FIG. 4). As detailed above, the pre-slip torque setting may provide torque values for a point right before the wheels 18 begin to slip at various speeds of vehicle 10.

Further, a load on the implement 16 may increase, such as when the implement 16 is digging into a pile of material or otherwise being filled. In such instances, a downforce on wheels 18 increases and the base torque setting may be inadequate to continue moving vehicle 10 in to the load (e.g., into a pile of material). Thus, in step 340, module 108 may determine whether a downforce is increasing. For example, module 108 may receive an implement pressure signal from pressure sensor 68 (e.g., lift cylinder pressure sensor). An increase in pressure of the lift cylinder corresponds to an increase in load (e.g., downforce) on the implement 16. If the downforce is not increasing (Step 340: NO), in step 345, module 108 may continue to operate the torque at the current torque setting. If the downforce is increasing (step 340: YES), in step 350, module 108 may increase the torque from the base torque setting in proportion to an amount of load on the implement 16 (e.g., based on the downforce). Module 108 may continue to increase the torque in proportion to the load on the implement 16 while the implement 16 is being loaded (e.g., implement 16 is being filled with material). Module 108 may increase the torque to the maximum torque setting when the implement 16 reaches a maximum load (e.g., the implement 16 is completely filled).

In some instances, a stalled condition of transmission system 40 may exist when the implement 16 is at a maximum load (e.g., implement is fully loaded with material) and vehicle 10 is at the maximum torque setting, and implement 16 is unable to lift or otherwise move the load. For example, the implement 16 may be pushing against the load with an amount of force such that vehicle 10 is unable to lift implement 16. Thus, in step 355, module 108 may determine whether a stalled condition exists (e.g., implement 16 is at a maximum load, vehicle 10 is at the maximum torque setting, and implement 16 is unable to lift or otherwise move the load). If the stalled condition does not exist (Step 355: NO), module 108 may continue to determine if the downforce is increasing (Step 340). If the stalled condition exists (Step 355: YES), in step 360, module 108 may slowly decrease the torque from the maximum torque setting until the stalled condition does not exist. As such, the amount of force of the implement 16 pushing against the load may be decreased and module 108 may be then able to lift implement 16.

Automatic torque control system 100 may provide automatic and proactive control of torque for vehicle 10. For example, automatic torque control system 100 may automatically control torque to a base torque setting when vehicle 10 engages with a load (e.g., engages a pile of material). Further, by automatically reducing the torque as soon as a load is engaged, automatic torque control system 100 may reduce or prevent wheel slippage. Thus, system 100 may provide a torque as close to the maximum torque as possible without slipping. System 100 may also increase the torque back to a maximum torque setting when the load is disengaged. Such a system 100 may create a more intuitive operator control and may allow more autonomy of the vehicle 10. Thus, the automatic torque control system 100 of the present disclosure may help operators execute various tasks, such as a loading an implement 16, may reduce operator effort/fatigue, may increase safety, and may help to reduce and/or prevent wheel slippage, wear on the wheels, and may reduce the likelihood of wheel failure.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A method for automatically controlling a torque of a vehicle, comprising:
   engaging an automatic torque control system, by a vehicle controller, when the vehicle engages a load, the vehicle controller including an auto wheel torque module that receives input signals from a plurality of sensors including a transmission system pressure sensor and a vehicle speed sensor, wherein the vehicle controller receives the input signals from the transmission system pressure sensor and determines a transmission pressure is greater than a transmission pressure threshold value;
   determining a type of ground surface, wherein the vehicle controller stores a plurality of values relating to different types of ground surfaces; and
   automatically decreasing the torque to a base torque setting for torque output from a transmission system when the vehicle controller detects when the vehicle engages the load and prior to one or more wheels of the vehicle slipping, wherein the vehicle controller generates the base torque setting based on the input signals from the plurality of sensors and the plurality of values, and
   the base torque setting is set to a first torque output value based on a first determined type of ground surface and set to a second torque output value based on a second determined type of ground surface.

2. The method of claim 1, further including detecting when the vehicle engages the load based on at least one of a decrease in a speed of the vehicle or an implement of the vehicle is in a pre-determined load engaging position.

3. The method of claim 1,
wherein the plurality of values relating to different types of ground surfaces include coefficient of friction values or coefficient of traction values between the one or more wheels and the determined type of ground surface.

4. The method of claim 1, wherein the type of ground surface is determined based on the vehicle controller receiving the input signals from the plurality of sensors.

5. The method of claim 1, wherein the base torque setting includes a constant torque value.

6. The method of claim 1, wherein the base torque setting includes various values of torque as a function of values indicative of speed of the vehicle.

7. The method of claim 1, further including:
setting the torque to a maximum torque setting prior to the vehicle engaging the load.

8. The method of claim 1, further including:
automatically increasing the torque to a maximum torque setting as the load on an implement of the vehicle increases until the torque substantially reaches a stalled condition; and
automatically decreasing the torque until the stalled condition does not exist.

9. The method of claim 1, further including automatically adjusting the base torque setting to a pre-slip torque setting.

10. The method of claim 1, further including automatically increasing the torque to a maximum torque setting when the vehicle disengages from the load.

11. An automatic torque control system, comprising:
a vehicle having one or more wheels;
a transmission system for providing a torque to the one or more wheels;
a sensor system, the sensor system including a transmission system pressure sensor with a transmission pressure threshold; and
a controller configured to:
  determine whether the one or more wheels are at a pre-slip condition that precedes the one or more wheels slipping, wherein the pre-slip condition is a condition where the vehicle pushes with a maximum torque without the one or more wheels slipping;
  detect when the vehicle engages a load, wherein the controller detects the load by receiving signals from the transmission system pressure sensor that a transmission system pressure is greater than the transmission pressure threshold; and
  automatically decrease the torque to a base torque setting, based on the signals from the transmission system pressure sensor, when the vehicle engages the load and prior to the one or more wheels slipping.

12. The system of claim 11, wherein the controller is further configured to detect when the vehicle engages the load based on a speed of vehicle or a position of an implement of the vehicle.

13. The system of claim 11, wherein the controller is further configured to:
automatically adjust the base torque setting to a pre-slip torque setting.

14. The system of claim 11, wherein the controller determines a type of ground surface based on the vehicle controller receiving the signals from the sensor system.

15. The system of claim 11, wherein the base torque setting includes various values of torque as a function of values indicative of a speed of the vehicle.

16. The system of claim 11, wherein the base torque setting includes a constant torque value.

17. The system of claim 11, wherein the controller is further configured to:
set the torque to a maximum torque setting prior to the vehicle engaging the load.

18. A method for automatically controlling a torque of a vehicle, comprising:
detecting an auto torque command is engaged when the vehicle is powered on for use, wherein the auto torque command is generated by an automatic torque control module;
setting, by the automatic torque control module, the torque to a maximum torque setting;
detecting, by a transmission pressure sensor, when the vehicle engages a load, wherein the automatic torque control module receives signals from the transmission pressure sensor and determines whether a transmission pressure is greater than a transmission pressure threshold value;
determining, by the automatic torque control module, a type of ground surface, wherein the automatic torque control module detects the type of ground surface present and automatically generates ground surface values and a pre-slip torque setting for one or more wheels, wherein the ground surface values are based on input signals the automatic torque control module receives from a plurality of sensors and the pre-slip torque setting is a maximum torque value that can be output without the one or more wheels slipping;
automatically decreasing the torque to a base torque setting when the vehicle engages the load and prior to the one or more wheels slipping, wherein the base torque setting is based on the determined type of ground surface; and
automatically increasing the torque to the maximum torque setting when the vehicle is not engaged with the load.

19. The method of claim 18, the method further comprising a step of:
determining whether the torque of the base torque setting is substantially equal to the pre-slip torque setting, wherein, if the torque of the base torque setting is less than the pre-slip torque setting, the torque, by the automatic torque control module, is increased to the torque of the pre-slip torque setting.

20. The method of claim 19, wherein, if the torque of the base torque setting is substantially equal to the pre-slip torque setting, the automatic control module maintains the torque of the base torque setting.

* * * * *